United States Patent Office 3,849,380
Patented Nov. 19, 1974

3,849,380
POLYESTERS
Peter Frederick Jackson and James Angus Wilson Reid, Runcorn, England, assignors to Imperial Chemical Industries Limited, London, England
No Drawing. Filed May 15, 1972, Ser. No. 253,104
Int. Cl. C08g 17/015
U.S. Cl. 260—75 R          15 Claims

ABSTRACT OF THE DISCLOSURE

Production of a polyester by polycondensation of a bis-(dihydric alcohol)ester of an aromatic dicarboxylic acid in the presence of a mixture of a salt of zinc, manganese or aluminium and a phosphonate or phosphinate, wherein the amount of each component of the mixture does not exceed 0.05% by weight.

---

This invention relates to the production of highly polymeric polyesters of aromatic dicarboxylic acids and dihydric alcohols.

Highly polymeric polyesters of aromatic dicarboxylic acids and dihydric alcohols are known to be useful thermoplastic materials capable of conversion to films, fibres and moulded articles having a desirable combination of physical and chemical properties. Examples of such polyesters are those prepared, for example, from terephthalic acid or 1,2-di(p-carboxyphenoxy)ethane and ethylene glycol or butane - 1,4 - diol or 1,4 - dihydroxymethylcyclohexane.

Many processes have been proposed for the production of these polyesters but in general they proceed via the formation of the bis(dihydric alcohol)ester of the aromatic dicarboxylic acid and the polycondensation of this intermediate to highly polymeric polyester with loss of dihydric alcohol by heating in a molten state under reduced pressure. The bis ester may be formed, for example, by reaction of the aromatic dicarboxylic acid or of an ester-forming derivative thereof, for example a dialkyl ester, with the dihydric alcohol, or by reaction of the dicarboxylic acid with an ester-forming derivative of the alcohol, for example, ethylene oxide or ethylene carbonate in the case of ethylene glycol. The process of reacting the acid with the dihydric alcohol is generally referred to as direct esterification, whereas the reaction of dialkyl ester with the dihydric alcohol is generally referred to as transesterification.

So as not to modify, dilute or lose the highly desirable characteristic properties of the highly polymeric polyesters of dihydric alcohols and aromatic dicarboxylic acids, it is usually preferred that the polycondensable material consist substantially entirely of one or more bis(dihydric alcohol) esters of aromatic dicarboxylic acids. However, the presence of a small concentration of other polycondensable material may be tolerated, if desired, for example to improve dyeability. For example, up to about 5 mole percent of the dihydric alcohol moiety in the bis ester or esters may be replaced by at least one other polycondensable dihydroxy compound and/or up to about 5 mole percent of the aromatic dicarboxylic acid moiety may be replaced by at least one other dicarboxylic acid. Up to about 5 mole percen of the polycondensable mixture may also consist of other mono- or polyfunctional material, if desired. However, it is usually preferred that at least 85 mole percent, and preferably at least 95 mole percent, of the polycondensable mixture consists of bis(dihydric alcohol) ester of aromatic dicarboxylic acid or an oligomer thereof.

Both the process of forming the intermediate and its conversion to highly polymeric polyester by polycondensation are aided by the use of catalysts, which are generally metal compounds. In most conventional processes, different catalysts are used for the preparation of the bis-(dihydric alcohol)ester intermediate and for the polycondensation, and the present invention provides an improved process for the polycondensation stage.

British Pat. No. 1,046,831 describes a process for the production of highly polymeric linear polyesters of aromatic dicarboxylic acids by the catalytic polymerisation of a bis(ω-hydroxyalkyl)ester or bis(hydroxycycloalkyl) ester of the aromatic dicarboxylic acid, wherein there is present during the polymerisation at least 0.05 percent, based on the weight of the dialkyl ester of the aromatic dicarboxylic acid, of certain specified organo-phosphorus compounds. The polymerisation is catalysed in conventional manner, for example with metallic compounds such as antimony trioxide.

British Pat. No. 1,013,573 describes a polyester composition comprising:

(1) A highly polymerised polyester derived from a difunctional acid component comprising at least 80 mole percent of terephthalic acid and a dihydric alcohol component comprising at least 75 mole percent of a polymethylene glycol or an alicyclic glycol; and (2) 0.1–20 mole percent (based on the difunctional acid component) of a defined additive which is a sulphonamide, phosphonate or phosphinate. The polyester is prepared in conventional manner, for example by a polycondensation reaction catalysed by a metallic compound, such as antimony trioxide, and the additive is added before, during or after the polycondensation reaction.

British Pat. No. 1,155,005 describes a process which comprises in a first stage reacting a dicarboxylic acid or mixture of acids, at least 80 mole percent of which is terephthalic acid, or a lower aliphatic ester thereof with a glycol to produce a diglycol ester of the dicarboxylic acid of its oligomer, and in a second stage polycondensing the diglycol ester or its oligomer to produce a polyester, wherein at least the second stage reaction is performed in the presence of:

(a) a cerium or lanthanum compound which is soluble in the diglycol ester of the dicarboxylic acid or its oligomer, and (b) a defined aralkylphosphonic acid or ester.

Our copending British patent application No. 19,286/70 (equivalent to published Dutch patent application No. 7105372) describes and claims:

A two-stage process for the production of highly polymeric polyesters by (1) transesterification of a mixture containing a dialkyl ester of an aromatic dicarboxylic acid and a dihydric alcohol and (2) subsequent polycondensation of the bis(dihydric alcohol) ester of the aromatic dicarboxylic acid formed, both stages being conducted in the presence of a catalytic system comprising a mixture of a metal salt containing a weakly acidic anion including oxide and a compound of the structure

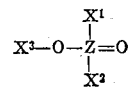

where $X^1$ is —R or —OR, $X^2$ is R and $X^3$ is H or R, where R is amonovalent hydrocarbon group or a substituted derivative thereof, and Z is a Group V–B element with an atomic number greater than 7.

We have now found that advantageous results may be obtained by the use of certain catalysts for the polycondensation reaction, in controlled quantities.

According to the present invention we provide a process for the production of highly polymeric polymer by the polycondensation of a polycondensable material at least 85 mole percent of which consists of at least one bis(dihydric alcohol)ester of an aromatic dicarboxylic acid or an oligomer thereof, the polycondensation being effected in the presence, as catalyst, of a mixture of (a) a metallic component which is a compound of zinc, manganese or aluminium including an anionic ligand, and
(b) an organic component which is a compound of the structure

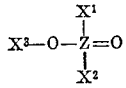

where Z is an element of Group V–B of the Periodic Table having an atomic number greater than 7, $X^1$ is —R or —OR, $X^2$ is —R, $X^3$ is —H or —R, and each R, which may be the same or different, is a hydrocarbon or substituted hydrocarbon group, in which process the amount of each component does no exceed 0.05% by weight of the polycondensable material.

(All references to the Periodic Table are to the version of the Periodic Table of the Elements printed inside the back cover of F. A. Cotton and G. Wilkinson—Advanced Inorganic Chemistry, 2nd Edition (1966) Interscience Publishers, New York, London and Sydney.)

Preferably, the amount of each component of the catalyst mixture does not exceed 0.05% by weight calculated on the basis of the dimethyl ester of the aromatic dicarboxylic acid.

The term "anionic ligand" includes oxide, so that, for example, zinc oxide is a suitable metallic component of the catalyst.

Particularly suitable anionic ligands are the anions of weak acids, for example the anions of organic acids, particularly organic carboxylic acids, or the anions derived from enolisable β-diketones, for example acetyl-acetone. It is preferred that the metallic component is a salt of an aliphatic carboxylic acid, for example an acetate. Zinc salts are particularly suitable and are therefore preferred.

Preferred examples of the groups R in the organic component are alkyl, aryl, aralkyl and cycloalkyl groups, particularly alkyl.

Preferably, R has 1 to 8 carbon atoms, as in methyl, ethyl, isomeric propyl, isomeric butyl, hexyl, cyclohexyl, octyl, and benzyl, for example. However, while it is preferred that R contains not more than eight carbon atoms, the presence in R of more than eight carbon atoms, as in decyl, dodecyl and naphthyl for example, is not excluded. One or more of the hydrogen atoms in R may be replaced, if desired, by other monovalent atoms or groups, for example halide, —NR'R", —NO$_2$, —OOCR', —COOR', —COR', —OR', —SO$_2$OR' or —OSO$_2$R' where each of R' and R" is hydrogen or a monovalent hydrocarbon radical, for example having 1 to 6 carbon atoms. It is preferable that the substituted groups (if any) are free of Zerewitinoff hydrogen if reaction of the catalyst with the polycondensable mixture is to be avoided. Preferably, Z is phosphorus, when the organic component will be a phosphinic or phosphonic acid or ester. Z may equally be arsenic, and the use of the heavier elements of Group V–B is not excluded.

Very suitable phosphorus compounds are alkyl dialkylphosphinates or dialkyl alkylphosphonates in which the alkyl groups, which may be the same or different, contain from 1 to 6 carbon atoms.

We have found in particular that the combination of zinc acetate and a phosphinate or phosphonate is capable of catalysing the reaction at concentrations of zinc acetate not exceeding 0.02 by weight of the dimethyl ester of the aromatic dicarboxylic acid, to give polyesters having high luminance and low yellowness. Preferably the concentration of each catalyst component does not exceed 0.02 by weight of dimethylester.

The invention is especially applicable to the production of polyesters wherein the dicarboxylic acid is at least 80 mole terephthalic acid, but other aromatic acids may also be used. Examples of other aromatic dicarboxylic acids include isophthalic acid and dinuclear dicarboxylic acids, for example those represented by the structure:

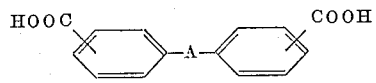

where A is a direct link or a divalent atom or group which is inert under the reaction conditions.

Examples of dihydric alcohols that may be used are α,ω-polymethylene glycols, especially those having the structure $HO(CH_2)_xOH$ where $x$ is from 2 to 10; branched aliphatic diols, for example 3,3,5-trimethylhexane-1,6-diol and neopentyl glycol; and alicyclic diols, for example 1,4-dihydroxymethylcyclohexane and 2,2,4,4-tetramethylcyclobutane-1,3-diol. Ethylene glycol and butane diol are preferred, especially the former.

The amount of catalyst used, calculated on the basis of weight of metallic component percent weight of dimethyl ester of terephthalic acid (or equivalent if other acids are used) may be in the range 0.0001 to 0.05%, preferably 0.005 to 0.05%. The amount of organic component is preferably in the molar ratio to metallic component to 1:1 to 2:1.

With the use of the catalyst in these concentrations, rapid reactions may be achieved. Moreover, with the use of many of the catalysts of our invention the clarity of the polyester melt has been observed to be better than that of high molecular weight polyesters obtained from many processes using conventional catalyst systems, for example based on metal acetates only and metal oxides.

It is an advantage of our process that the metallic component and the organic component, as defined above, may be the sole essential ingredients of the catalyst and it is unnecessary to add further catalysts such as antimony trioxide.

The polycondensable material may be produced in conventional manner by direct esterification or by transesterification. It is preferred that the polycondensable material is produced by direct esterification of the aromatic dicarboxylic acid with the dihydric alcohol.

Conventional reaction conditions may be used for the polycondensation reaction and other additives may be included before, during or after the reaction, for example, for delustering, stabilizing, pigmenting and/or otherwise modifying the high molecular weight polyester product.

The invention is now illustrated by the following Examples.

Luminance (L) and yellowness (Y), when measured, were determined using a "Colormaster" differential Colorimeter manufactured by the Manufacturers Engineering and Equipment Corporation.

Two general polymerisation procedures were employed. In both methods, a polymerisation vessel was charged with bis(2-hydroxyethyl) terephthalate, which had been prepared in conventional manner either by transesterification of dimethyl terephthalate and ethylene glycol or by direct esterification of terephthalic acid with ethylene glycol. Polycondensation was then carried out as described below.

In method A, a glass polycondensation vessel was used which was fitted with a nitrogen inlet dipping below the level of the reactants, thereby effecting agitation. There was also provision of a vacuum offtake and condensing arrangements for volatile materials.

In method B, a stainless steel autoclave was used, which was provided with a double helical metal stirrer.

In both methods, titanium dioxide was added if delustred polymer was required. The temperature was then raised to 280° C. Pressure within the vessel was reduced to 0.5 mm. of mercury absolute over a period of 30 minutes and heating was continued at 285° C. for 3 hours in the glass vessel or 1½ hours in the steel vessel. The polymeric reaction product was extruded onto chill-cast rollers and the intrinsic viscosity (I.V.) and L and Y values were measured.

Intrinsic viscosity was determined from relative viscosity measured in 1% solution in o-chlorophenol at 25° C.

Abbreviations: Me=methyl, Et=ethyl, iPr=isopropyl, Ph=phenyl, Ac=acetate, Acac=acetylacetonate.

EXAMPLES 1–7

A series of polymers were prepared by procedure A with 0.015% by weight (based on dimethyl terephthalate) of zinc acetate dihydrate and various phosphorus compounds. Results are summarised in the following table.

| Example number | Phosphorus compound | Moles of phosphorus per mole zinc | IV | L | Y |
|---|---|---|---|---|---|
| 1 | Me(Ph)P(O)OMe | 2 | 0.49 | 78 | 11 |
| 2 | Me(Ph)P(O)OMe | 1 | 0.52 | 85 | 7 |
| 3 | Me(Ph)P(O)OH | 2 | 0.57 | 82 | 12 |
| 4 | Me(Ph)P(O)OH | 1 | 0.55 | 78 | 16 |
| 5 | Me$_2$P(O)OH | 2 | 0.55 | 77 | 12 |
| 6 | Me$_2$P(O)OH | 1 | 0.57 | 84 | 10 |
| 7 | Me$_2$P(O)OMe | 1 | 0.58 | 80 | 18 |

EXAMPLES 8–13

A series of polymers were prepared using procedure A with 0.025 by weight (based on dimethylterephthalate) of manganese acetate with various phosphorus compounds. Results are summarised in the following table.

| Example number | Phosphorus compound | Moles of phosphorus per mole manganese | IV | L | Y |
|---|---|---|---|---|---|
| 8 | (EtO)$_2$P(O)Me | 2 | 0.52 | 89 | 14 |
| 9 | (iPrO)$_2$P(O)Me | 1 | 0.50 | 81 | 22 |
| 10 | Me(Ph)P(O)OMe | 2 | 0.50 | 87 | 8 |
| 11 | Me(Ph)P(O)OMe | 1 | 0.54 | 87 | 13 |
| 12 | Me$_2$P(O)OH | 1 | 0.49 | 82 | 17 |
| 13 | Me$_2$P(O)OMe | 1 | 0.56 | 81 | 24 |

EXAMPLES 14–19

A series of polymers were prepared using procedure B with 0.015% by weight (based on dimethylterephthalate) of zinc acetate dihydrate and various phosphorus compounds. In all cases 0.38% by weight of titanium dioxide was added as a delustrant. Results are summarised in the following table.

| Example number | Phosphorus compound | Moles of phosphorus per mole zinc | IV | Colour |
|---|---|---|---|---|
| 14 | (MeO)$_2$P(O)OMe | 2 | 0.78 | White. |
| 15 | Me$_2$P(O)OH | 1 | 0.79 | Do. |
| 16 | Ph$_2$P(O)OH | 2 | 0.76 | Do. |
| 17 | (EtO)$_2$P(O)Et | 2 | 0.76 | Do. |
| 18 | (EtO)$_2$P(O)CH$_2$Ph | 2 | 0.70 | Do. |
| 19* | MePhP(O)OMe | 2 | 0.62 | Do. |

*Zinc acetate replaced by zinc oxide (0.0055% by weight, calculated on the basis of dimethyl terephthalate).

EXAMPLES 20 AND 21

A series of polymers were prepared using procedure B with aluminum compounds and various phosphorus compounds as catalysts. In each case 0.5% by weight of titanium dioxide was added as a delustrant. Results are shown below.

EXAMPLE 22

Polymer was made using procedure B with 0.015% by weight (based on dimethyl terephthalate) of zinc acetate dihydrate, and two moles of dimethylarsinic acid per mole of zinc salt. 0.38% by weight of titanium dioxide was added as a delustrant. White polymer was obtained with an intrinsic viscosity of 0.72.

What we claim is:

1. A process for the production of highly polymeric polymer by the polycondensation of a polycondensable material, at least 85 mol percent of which consists of at least one bis(dihydric alcohol) ester of an aromatic dicarboxylic acid or an oligomer thereof, the polycondensation being effected in the presence, as catalyst, of a mixture of
   (a) a metallic component which is a weak acid salt of zinc, manganese or aluminum or zinc oxide and
   (b) an organic component which is a compound of the structure

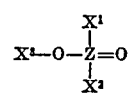

wherein Z is selected from the group consisting of arsenic and phosphorus, $x^1$ is —R or —OR, $x^2$ is —R, $x^3$ is —H or —R, and each R, which may be the same or different, is a saturated aliphatic or aromatic hydrocarbon,
in which process the amount of each component is 0.0001 to 0.05% by weight of the polycondensable material.

2. A process as claimed in claim 1 in which the amount of each component is 0.0001 to 0.05% by weight calculated on the basis of the dimethyl ester of the dicarboxylic acid.

3. A process as claimed in claim 1 in which the weak acid salt is derived from an organic carboxylic acid or an enolisable β-diketone.

4. A process as claimed in claim 3 in which the weak acid salt is an aliphatic carboxylate.

5. A process as claimed in claim 1 in which the metallic component is a zinc salt.

6. A process as claimed in claim 1 in which the groups R in the organic component are each alkyl, aryl, aralkyl or cycloalkyl, having from 1 to 8 carbon atoms.

7. A process as claimed in claim 6 in which each group R is alkyl.

8. A process as claimed in claim 1 in which the organic component is a phosphinic or phosphonic acid or ester.

9. A process as claimed in claim 1 in which the molar ratio of organic component to metallic component is in the range 1:1 to 2:1.

10. A process as claimed in claim 1 in which the amount of metallic component, calculated on the basis of the dimethyl ester of the dicarboxylic acid, is 0.0001 to 0.5% by weight.

11. A process as claimed in claim 1 in which the catalyst is a mixture of zinc acetate and an alkyl phosphinate or phosphonate, and the amount of zinc acetate, calculated on the basis of the dimethyl ester of the dicarboxylic acid, does not exceed 0.02% by weight.

12. A process as claimed in claim 1 in which the catalyst consists of the metallic component and the organic component as sole essential ingredients.

| Example number | Phosphorus compound | Metal compound | Percent weight of metal salt based on dimethyl terephthalate | Moles of phosphorus compound per mole aluminium | IV | Colour |
|---|---|---|---|---|---|---|
| 20 | Me$_2$P(O)OH | Al(AcAc)$_3$ | 0.036 | 3 | 0.72 | White. |
| 21 | (MeO)$_2$P(O)Me | Al(AcAc)$_3$ | 0.036 | 3 | 0.69 | Do. |

13. A process as claimed in claim 1 in which the dicarboxylic acid component of the polycondensable material is terephthalic acid.

14. A process as claimed in claim 1 in which the dihydric alcohol component of the polycondensable material is ethylene glycol.

15. A process as claimed in claim 1 in which the polycondensable material has been prepared by direct esterification.

References Cited

UNITED STATES PATENTS

| | | | |
|---|---|---|---|
| 2,951,827 | 9/1960 | Siggel | 260—75 |
| 3,068,205 | 12/1962 | Smith | 260—75 |
| 3,391,122 | 7/1968 | Bice | 260—75 |
| 3,459,711 | 8/1969 | Hartmann et al. | 260—75 |
| 3,496,145 | 2/1970 | Carter et al. | 260—75 |
| 3,509,099 | 4/1970 | Carter et al. | 260—75 |
| 3,528,946 | 9/1970 | Stewart et al. | 260—75 |
| 3,594,347 | 7/1971 | Lazarus et al. | 260—45.75 |
| 3,652,503 | 3/1972 | Hewertson et al. | 260—75 |
| 2,951,060 | 8/1960 | Billica | 260—75 |

FOREIGN PATENTS

| | | |
|---|---|---|
| 2,102,841 | 8/1971 | Germany. |
| 1,958,168 | 7/1970 | Germany. |
| S.6,611,742 | 2/1967 | Netherlands. |
| 1,444,620 | 7/1966 | France. |

MELVIN GOLDSTEIN, Primary Examiner

UNITED STATES PATENT OFFICE
CERTIFICATE OF CORRECTION

Patent No. 3,849,380                    Dated November 19, 1974

Inventor(s) Peter Frederick JACKSON et al

It is certified that error appears in the above-identified patent and that said Letters Patent are hereby corrected as shown below:

Please add the following information to the heading:

[30] Foreign Application Priority Data

May 17, 1971    Great Britain         15270/71

Signed and sealed this 11th day of February 1975.

(SEAL)
Attest:

RUTH C. MASON
Attesting Officer

C. MARSHALL DANN
Commissioner of Patents
and Trademarks